May 20, 1941.   E. J. RAY   2,242,262
LUBRICATING DEVICE
Filed May 3, 1938
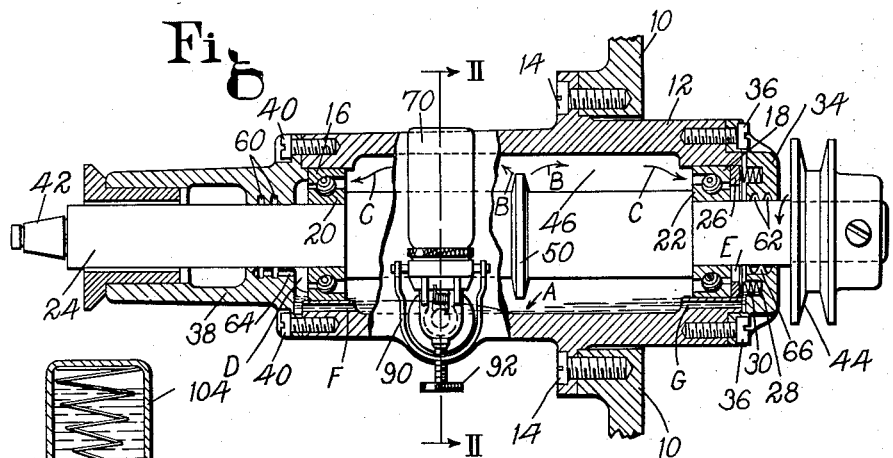
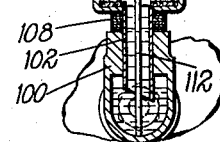
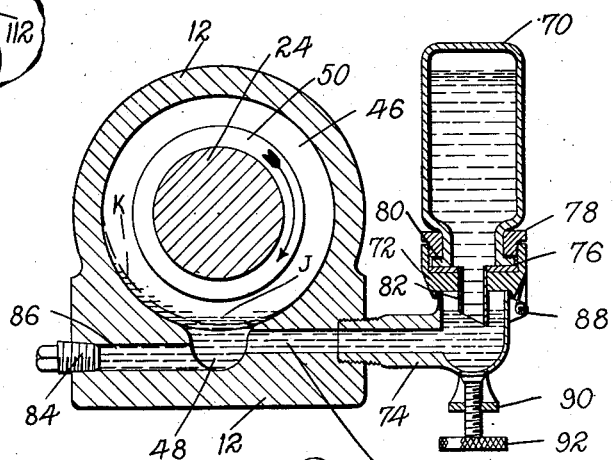
INVENTOR
Eugene J. Ray
By his attorney
Frederick L. Edmonds Patented May 20, 1941

2,242,262

UNITED STATES PATENT OFFICE 2,242,262

LUBRICATING DEVICE

Eugene J. Ray, Beverly, Mass., assignor to United Shoe Machinery Corporation, Borough of Flemington, N. J., a corporation of New Jersey Application May 3, 1938, Serial No. 205,750

5 Claims. (Cl. 308—187)

This invention relates to lubricating devices and is herein illustrated as embodied in a machine having roller bearings carrying a high speed shaft.

The use of bearings having balls, or any other type of rolling elements, in connection with a shaft intended to rotate at a high speed is, of course, desirable, as they reduce bearing friction to a minimum; but the highest possible speed at which such bearings can be operated without excessive heating depends, to a great extent, upon the effectiveness of their lubrication. That is, high speed bearings when lubricated with oil in the ordinary manner are likely to become overheated because of the fact that, when a substantial amount of oil is present in the bearings, considerable work (which is changed into heat) must be performed on the oil particles in moving them from place to place in the bearings and relatively to each other.

In view of the foregoing, one of the principal objects of the present invention is to provide a device for supplying lubricant in an adequate but so minute a quantity to roller bearings that they may be operated at a substantially higher speed than has been possible heretofore.

To this end the invention provides, as one feature thereof, a housing arranged to support a bearing carrying a high-speed shaft, the housing being spaced from the ends of the bearing and being out of contact with an oil supply in the means bottom of the housing for directing small particles of oil into the air in the housing, thereby creating a "fog" of lubricant, and circulating the "fog" throughout the housing and through the bearing from one end to the other. Thus the bearing will receive an adequate and continually replenished deposit of lubricant which is so minutely thin that no appreciable amount of work will be expended upon the lubricant. Accordingly, there will be no appreciable heating in the oil or bearing although it is operated at very high speed.

In the illustrated construction the above-mentioned means for creating and circulating the "fog" of lubricant, in accordance with another feature of the invention is constituted by a turbulator carried by the shaft and adapted to induce an air current adjacent thereto which is faster than the rotary motion of the air at any other point lengthwise of the shaft, thereby providing sufficient turbulence in the "fog" of lubricant to insure its circulation through the bearings as mentioned above.

In order to insure against excessive lubrication of the bearing such as would result from its being immersed in or sprayed by oil or the like, means, constituting another feature of the invention, is provided in the illustrated machine for maintaining the lubricant or oil in the housing at such a level that even, when its surface is disturbed by the turbulence of the "fog" in the housing, it always remains below and out of contact with any of the moving parts of the bearing and the shaft. Preferably this means is in the form of a barometric feeding device, the position of which may be adjusted to vary the height of the level of the lubricant in the housing, as required by different operating conditions.

In the drawing,

Fig. 1 is a view, partly in vertical section, of a bearing housing provided with a high speed shaft arranged to run in ball bearings, and an illustrative bearing lubricating device embodying the invention;

Fig. 2 is a transverse sectional view, along the line II of Fig. 1, as seen in the direction of the arrows, and showing a barometric feed device by which the oil is maintained at a constant level in the bearing housing to suit constant operating conditions; and Fig. 3 is a similar transverse sectional view of a barometric feed device in which the level of the oil may be adjusted to suit different operating conditions and then be maintained at that level.

The invention is illustrated in the accompanying drawing as applied to the mounting of a cutter shaft of a machine for trimming the outer edge of a shoe sole, such a machine being known to shoe manufacturers as an edge-trimming machine. A portion of the frame of such a machine is illustrated at 10 in Fig. 1. A housing 12 is secured to the frame by means of a series of screws 14. At each end of the housing are mounted ball-bearings having outer races 16, 18 and inner races 20, 22 respectively. The outer races 16, 18 are a sliding fit in bored surfaces in the housing 12 but the inner races 20, 22 fit tightly on a cutter shaft 24 having shoulders against which the races 20, 22 are seated.

The bearing is designed to operate under a "spring load," as is the usual practice, to maintain it in proper adjustment. For this purpose, a washer 26 mounted to bear against the right-hand ball race 18 (Fig. 2) is pressed to the left by means of a series of compression springs 28 inserted in recesses 30 in an end-bearing cap 34 secured to the end of the housing 12 by means of screws 36. The pressure of the springs 28 against the washer 26 urges the ball race 18 toward the left, the thrust of which race is transmitted by the adjacent balls, the inner race 22 and shaft 24 to the inner race 20, and thence through the balls therein, to the outer race 16 at the left-hand end of the housing. The outer race 16 is held in the housing by an elongated bearing cap 38 secured to the left-hand end of the housing by screws 40. In this way the shaft runs smoothly with all radial and lengthwise backlash taken up.

The usual edge-trimming cutter (not shown) is mounted on a conical seat 42 on the left-hand end of the shaft 24 in the usual manner. On the opposite end of the shaft is mounted a grooved pulley 44 for driving the same.

Within the housing 12 is a chamber 46, the bottom of which serves as a reservoir for a supply of liquid oil and includes a sump portion 48. Integral with the shaft 24 and located midway between the ball bearings is a collar 50 which serves to supply a mixture of air and oil in the form of a vapor or "fog" to the bearings, as will be described. Other shapes may be used instead of a collar, and all such devices may be termed "turbulators" as they create turbulence within the housing 12. It should be observed that, whether the shaft is moving or is at rest, the level of the liquid oil is always below the level of the rotatable collar 50, or other "turbulator" and always below the balls in the races 16 and 18. Thus, the liquid oil is always out of contact with moving parts. It is believed that the "fog" is created and circulated substantially as described below.

When the collar 50 is rotated at the high speed of the illustrated machine (which is at approximately 11,000 revolutions per minute), its periphery travels at somewhat over a mile per minute. A current of air is dragged around by the friction between the air and the collar 50 and is finally thrown off tangentially from the collar at the above-mentioned high speed and blows across the top surface of the liquid oil, causing a groove to be formed in the upper surface of the oil beneath the collar. This groove or depression is indicated at A (Fig. 1) by the line which represents the oil level directly below the axis of the shaft 24 longitudinally of the chamber 46. As this current of air sweeps across the surface of the oil, it gathers up minute particles of oil to form a vapor or "fog" which fills the chamber 46 above the surface of the liquid oil. When this current, which travels faster opposite the collar than elsewhere, strikes the inside wall of the housing, it divides as indicated by the arrows B—B and flows in substantially equal parts toward the two ball bearings as indicated by the arrows C—C. Owing to the spaces between the races and around the individual balls on both sides of the bearings, the oil "fog" passes freely across the path of travel of the balls or rollers and over the raceways, leaving a minute film thereon. It then passes through the spaces D and E and eventually unites with the main body of liquid oil in the chamber for recirculation. The ports F and G provide means for equalizing the level of the liquid oil and for draining the spaces D and E so that liquid oil that may be formed by condensation of the vapor in the spaces D and E is by-passed under the bearings to prevent flooding thereof.

The rotation of the air produced by the rotation of the collar 50 (and, to a less extent, the shaft 24), in addition to producing the heretofore mentioned groove indicated at A (Fig. 1), also tends to drag the liquid oil around with it so that the oil is slightly lowered on the side of the chamber where this air first strikes it, and is raised slightly on the opposite side. This effect is indicated by J in Fig. 2 (at the plane indicated by II in Fig. 1) and by the line K also in Fig. 2, which shows the bottom of the groove in the liquid oil directly beneath the collar 50 (at A in Fig. 1).

It should be noted that the annular space between the housing 12 and the shaft 24, with its collar 50, is constricted by the presence of liquid oil in the lower portion thereof. This constriction evidently acts as a baffle to increase the pressure of the current of air and oil as it strikes this baffle, so as to assure more complete circulation to all portions of the bearings.

In order to prevent dust and dirt from reaching the bearings and to prevent the egress of oil therefrom, each of the bearing caps 38 and 34 is provided with baffle grooves 60 and 62, respectively. Any oil that collects in these grooves drains back into the lower part of the chamber 46 through ducts 64 and 66. Only an extremely small clearance space is provided between the caps and the shaft at these points and it has been found that these grooves adequately accomplish the purpose for which they are provided, even after months of use.

As previously stated, a barometric feed device is provided to control the level of the liquid oil in the chamber 46. Two forms of such a device are shown in the drawing, a non-adjustable form in Figs. 1 and 2, and an adjustable form in Fig. 3. When operating conditions are not constant or the optimum height of the level of the liquid oil has not been determined, an adjustable form, of the general type shown in Fig. 3, is to be preferred because, by its use, the most suitable height of the oil level may be obtained at will. However, when the operating conditions are substantially constant, as in the operation of the illustrative trimming machine, and the required height of the oil level has been previously determined, the non-adjustable form is to be preferred.

Best shown in Fig. 2 is a usual form of a barometric feed device having a glass container 70 which is secured to the cover 72 of a usual type of oil cup 74 in the following manner. The cover 72 is threaded at 76 to receive a split nut 78, which, upon being screwed downwardly, causes a flange 80, integral with the container 70 to be clamped between suitable gaskets seated on the nut 78 and cover 72 to render the construction oil tight. Sealed in the cover is a tube 82 beveled at its lower end. Liquid oil will pass from the container 70 through the tube 82, through the oil cup 74 and thence through a duct 83 in the housing 12 into the sump 48 and the lower part of the chamber 46, until the level of the oil rises sufficiently to seal the tube 82. Thus, any further flow of oil from the tube 82 is stopped until the oil level falls below the end of the tube, as is usual in barometric feed devices. Accordingly, the level of the liquid oil in the chamber 46 in the housing 12 is maintained at the optimum height below the balls and raceways and below the collar 50, or, in other words, out of contact with moving parts, as heretofore explained. A drain plug 84 closes a drain duct 86 which may be used to drain oil from the chamber 46 and sump 48 when desirable. The cover 72 of the oil cup is pivoted at 88 and it may be tipped about this pivot to facilitate filling and then brought back into operative position, as shown in Fig. 2. It may then be locked in position by means of a bail 90 secured to the cover and a thumb screw 92.

In the adjustable form of barometric feed device, shown in Fig. 3, a fitting 100 communicating with the duct 83, is tapped into the side of the housing 12 and is adapted to receive an oil tube 102 (similar to 82) with a sliding but oil-tight fit. An oil container 104 is mounted on top of a cap 106 to which the tube 102 is fixed (by a split nut and gaskets as in the other construction). One or more washers 108 may be placed between the cap 106 and fitting 100 in order to adjust the bottom of the tube to any required height. In order to prevent oil from spilling from the container when it is being inserted in or removed from the fitting 100, a spring-pressed valve 110 is arranged to close the opening in the upper end of the tube 102 whenever the latter is disengaged from the fitting 100. The valve 110 is held in its open position when the tube 102 is assembled in the fitting 100 so as to establish barometric feed conditions, by a valve stem 112 which strikes the fitting shortly before the tube 102 is lowered to its operative position.

Summarizing the operation of the illustrated machine, as the periphery of the collar 50 travels at somewhat over a mile per minute, the air surrounding it is carried over the surface of the oil at such a high speed that minute particles of oil are taken from the surface of the oil and mixed with the air in the chamber 46 to form the above-described vapor or "fog."

Since the speed of the air traveling across the surface of the oil is greater beneath the collar than elsewhere along the shaft, the level of the oil beneath the collar is lowered in a groove-like formation and a current is induced in the air adjacent to the collar which increases the turbulence of the "fog" and thus insures a vigorous circulation of the "fog" through the casing. Owing to the spaces D and E between the ends of the housing and the bearings, and also between the rollers themselves in the raceways, the "fog" passes across the path of the rollers to lubricate them. It should be noted that, at all times, whether the shaft is moving, or is at rest, the level of the liquid oil is always below the level of the rotatable collar 50 and always below the rollers in the races of the roller bearings. The liquid oil is thus always maintained out of contact with moving parts by the barometric feed device referred to above.

The amount of oil gathered by the current of air from the collar decreases with the distance of the oil level beneath the lowest part of the collar, and of the different operating conditions, an increased speed, a wider collar or a collar of larger diameter, all require a lower oil level to reduce the supply of oil to the optimum amount and vice versa. However, there may be considerable deviation from the optimum level without adversely affecting the operation of the device substantially.

It has been found by test that a machine, in which the present invention is used, will operate without leakage or overheating for several months and without refilling or requiring any other attention to the lubricating system on the part of the operator. Applicant does not wish to be limited to the use of "air" in his invention, as many other gaseous materials, such as those used in refrigeration, will function equally as well.

Having thus described my invention, what I claim as new and desire to secure by Letters Patent of the United States is:

1. A lubricating system for a roller bearing carrying a high speed shaft having, in combination, a housing for said shaft and bearing, said housing being spaced from the ends of said bearing and adapted to hold liquid oil, and a turbulator mounted on the shaft for creating a mixture of air and oil in the housing and circulating it through the bearing from one side thereof to the other, said turbulator having its lowest portion always above the highest level of the oil in the housing.

2. A lubricating system for a roller bearing carrying a high speed shaft having, in combination, a housing surrounding said bearing and shaft and arranged to contain a supply of liquid lubricant in its lower portion, and a rotary turbulator in the housing and located out of contact with the liquid lubricant therein, said turbulator causing a rapid passing of air across the surface of the liquid lubricant whereby minute particles thereof are picked up, mixed with the air and circulated solely as a vapor or "fog" in the housing and in the bearing.

3. A lubricating system for spaced roller bearings carrying a high speed shaft having, in combination, a housing for said shaft and bearings arranged to contain a supply of liquid oil, and a turbulator operated by the shaft for forcing air across the surface of the liquid oil to create a mixture of air and oil in the housing and to circulate it in said bearings, said turbulator being located out of contact with the liquid oil at all times.

4. A lubricating system having, in combination, a housing arranged to contain a supply of liquid lubricant in its lower portion, a high speed shaft passing through said housing, a roller bearing for the shaft, and a smooth concentric collar on said shaft and rotating therewith, the rotating collar creating a turbulence of the air in the housing by which minute particles of liquid lubricant are picked up from the surface of the liquid and are circulated in the housing and in the bearing solely as a vapor or fog, said shaft, collar and the moving parts of said bearing being located at all times out of contact with said liquid lubricant in the housing.

5. A lubricating system for relatively moving parts comprising, in combination, a housing surrounding the parts and arranged to contain a supply of liquid lubricant, and a high speed rotary turbulator in the housing and located out of contact with the liquid lubricant therein, said turbulator causing a rapid passing of air across the surface of the liquid lubricant whereby minute particles thereof are picked up, mixed with the air, and circulated solely as a vapor or "fog" in the housing to lubricate said parts.

EUGENE J. RAY.